UNITED STATES PATENT OFFICE.

WILLIAM H. PAGE, OF NEW YORK, N. Y.

IMPROVED FEED-RATION FOR ARMY USE, &c.

Specification forming part of Letters Patent No. 38,798, dated June 2, 1863.

*To all whom it may concern:*

Be it known that I, WILLIAM H. PAGE, of the State, county, and city of New York, have invented a new and useful mode of preparing forage and feed for rations of an army, or other analogous purpose; and I hereby declare that the following is a full, clear, and exact description thereof.

The object of my invention is to provide an army with rations for its horses and cattle, which are so treated that a given ration shall occupy only a fraction of the bulk of the same ration in its ordinary form, thereby materially diminishing the time, expense, and trouble of transportation.

To effect this I take any desired quantity of the grain which is to constitute part of the ration, such as corn, oats, or as the case may be. This may be ground or not, as preferred. I then, by any of the ordinary means, cut any proposed amount of hay or other forage into pieces, which I prefer should be about an inch in length. I next put the ground grain and cut forage together into a mass of any convenient bulk, and place the whole in any press of good construction, such as is used for pressing tobacco or for analogous purposes, and compress it firmly until it is made as compact and small in bulk as it conveniently can be.

To preserve the shape and size of the ration while it is being pressed, I prefer to put it into a mold of the dimensions which it is to have when finished, though the mold may be deeper than the thickness of the prepared ration, so that its sides may confine the material properly while the compression is taking place. This mold may be of wood or any other suitable material, and may be made like a box, without top or bottom. It is to be set into the press and the loose, incompacted material put into it and pressed to the form of the mold, the thickness of the mass being of course determined by the degree of compression desired.

For convenience of transportation I usually put up the rations in bags tightly sewed. To do this I prefer, after the mold is in the press and before the material is placed in the former, to lay a piece of bagging, cut to a size which will inclose the finished ration, inside the mold, letting the ends hang over outside. I then put in the mass to be pressed, and when it is sufficiently compacted I take it out, draw together the ends of the bagging, cutting off any surplus there may be, and sew them firmly. The ration is then ready for the market.

I do not think that it will be found profitable to compress the grain and forage into a less bulk than will constitute one day's ration, which in this country is ordinarily about fourteen pounds of hay and twelve pounds of grain; but a larger quantity than this can be advantageously treated by my mode, and after it is pressed it may be cut up into any required dimensions.

By this improvement I am enabled to put into a space of, say, two hundred pounds an amount of forage and feed which in its ordinary form would occupy a space of sixteen hundred pounds. The very important saving in many ways which I thus effect will be obvious to all familiar with the subject. All the rations for the horses and cattle of an army may, by my invention, be transported with far less trouble than now required, and in about one-eighth of the time and at about one-eighth of the expense hitherto necessary, while at the same time the number of animals, wagons, and teamsters needed for the duty is reduced in the same proportion.

The want of a facility of this character has long been felt, and its benefits will be fully recognized by military men.

For cavalry or artillery on special service my improvement is particularly desirable, as the men can easily carry with them rations for several days, and for short marches they may even transport a sufficient quantity of this compressed feed in their pockets or on their saddles.

I do not claim the pressing, considered by itself, of either grain or hay, straw, or analogous substance; but What I do claim, and desire to secure by Letters Patent, is—

The ration composed and prepared substantially as described.

WILLIAM H. PAGE.

Witnesses:
ANDREW I. TODD,
JOHN J. LYON.